(12) United States Patent
Somasundaram (10) Patent No.: US 7,155,563 B1
(45) Date of Patent: Dec. 26, 2006

(54) CIRCUITS TO GENERATE A SEQUENTIAL INDEX FOR AN INPUT NUMBER IN A PRE-DEFINED LIST OF NUMBERS

(75) Inventor: Madian Somasundaram, Los Altos Hills, CA (US)

(73) Assignee: Spans Logic Inc., Mountain View, CA (US)

( * ) Notice: Subject to any disclaimer, the term of this patent is extended or adjusted under 35 U.S.C. 154(b) by 331 days.

(21) Appl. No.: 10/763,020

(22) Filed: Jan. 21, 2004

Related U.S. Application Data (60) Provisional application No. 60/455,150, filed on Mar. 15, 2003, provisional application No. 60/442,779, filed on Jan. 27, 2003, provisional application No. 60/441,809, filed on Jan. 21, 2003.

(51) Int. Cl.
*G06F 12/00* (2006.01)

(52) U.S. Cl. ...................................... 711/108
(58) Field of Classification Search ...................... None
See application file for complete search history.

(56) References Cited

U.S. PATENT DOCUMENTS

| | | | |
|---|---|---|---|
| 6,266,262 B1 | 7/2001 | Washburn et al. | |
| 6,307,798 B1 | 10/2001 | Ahmed et al. | |
| 6,331,961 B1 | 12/2001 | Kengeri et al. | |
| 6,560,610 B1 | 5/2003 | Eatherton et al. | |
| 6,738,862 B1 * | 5/2004 | Ross et al. | 711/108 |
| 6,754,685 B1 * | 6/2004 | Becker | 708/209 |

OTHER PUBLICATIONS

Baboescu, Florin and Varghese, George, Scalable Packet Classification, UC San Diego, SIGCOMM'01, Aug. 27-31, 2001.

CAMs In Packet Classification: Can Fully Algorithmic Solutions Still Compete?, Netronics, Jul./Aug. 2001.

commsdesign web pages [online]. CommsDesign.com [retrieved on Feb. 2, 2004]. Retrieved from the Internet: <URL: http://www.commsdesign.com/printableArticle/;jsessionid=0WZT1VRSWGMPGQSNDBC...>, 1 page.

commsdesign web pages [online]. CommsDesign.com [retrieved on Jun. 23, 2003]. Retrieved from the Internet: <URL: http://www.commsdesign.com/design_corner/OEG20030619S0013>, 7pages.

Gupta, Pankaj et al., Routing Lookups in Hardware at Memory Access Speeds, Stanford University.

Gupta, Pankaj and McKeown, Nick, Packet Classification on Multiple Fields, Stanford University.

Ichiriu, Mike, NetLogic Microsystems™ White Paper: High Performance Layer 3 Forwarding, 2000, pp. 1-6, NetLogic Microsystems, Inc.

MOSAID The Next Generation of Content Addressable Memories, Sep. 1999, MOSAID Technologies Incorporated.

Welfeld, Feliks, Packet Classification Processor: The Ultimate Branching Machine, CTO, Solidum, 2001.

UTCAM-Engine Technical Summary, UTC Microelectronic Systems, Sep. 2000.

* cited by examiner

*Primary Examiner*—Mano Padmanabhan
*Assistant Examiner*—Duc T Doan
(74) *Attorney, Agent, or Firm*—Fenwick & West LLP (57) ABSTRACT

Circuits are described that can detect the presence or absence of an input number in a pre-defined list of numbers, and provide an index into the list for a matching number. The elements of the list of numbers may be individual numbers, or sets of numbers within a range of numbers.

20 Claims, 9 Drawing Sheets

| Index | Word | Value |
|---|---|---|
| 0 | 00000111 | 7 |
| 1 | 00001000 | 8 |
| 2 | 01001001 | 73 |
| 3 | 01100110 | 102 |
| 4 | 01110111 | 119 |
| 5 | 10000000 | 128 |
| 6 | 10000001 | 129 |
| 7 | 11000001 | 193 |

FIG. 4

| Row # | Last Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | -1 | 0 | 0 | 0 | 0 | 0 | 0 | 0 | 1 | 1 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 | 0 | 0 | 0 | 0 | 0 | 0 |
| 3 | 1 | 0 | 0 | 0 | 0 | 0 | 0 | 0 | 0 | 0 | 0 | 0 | 0 | 0 | 0 | 0 | 0 |
| 4 | 1 | 0 | 0 | 0 | 0 | 0 | 0 | 0 | 0 | 0 | 1 | 0 | 0 | 0 | 0 | 0 | 0 |
| 5 | 2 | 0 | 0 | 0 | 0 | 0 | 0 | 0 | 0 | 0 | 0 | 0 | 0 | 0 | 0 | 0 | 0 |
| 6 | 2 | 0 | 0 | 0 | 0 | 0 | 0 | 1 | 0 | 0 | 0 | 0 | 0 | 0 | 0 | 0 | 0 |
| 7 | 3 | 0 | 0 | 0 | 0 | 0 | 0 | 0 | 1 | 0 | 0 | 0 | 0 | 0 | 0 | 0 | 0 |
| 8 | 4 | 1 | 1 | 0 | 0 | 0 | 0 | 0 | 0 | 0 | 0 | 0 | 0 | 0 | 0 | 0 | 0 |
| 9 | 6 | 0 | 0 | 0 | 0 | 0 | 0 | 0 | 0 | 0 | 0 | 0 | 0 | 0 | 0 | 0 | 0 |
| 10 | 6 | 0 | 0 | 0 | 0 | 0 | 0 | 0 | 0 | 0 | 0 | 0 | 0 | 0 | 0 | 0 | 0 |
| 11 | 6 | 0 | 0 | 0 | 0 | 0 | 0 | 0 | 0 | 0 | 0 | 0 | 0 | 0 | 0 | 0 | 0 |
| 12 | 6 | 0 | 1 | 0 | 0 | 0 | 0 | 0 | 0 | 0 | 0 | 0 | 0 | 0 | 0 | 0 | 0 |
| 13 | 7 | 0 | 0 | 0 | 0 | 0 | 0 | 0 | 0 | 0 | 0 | 0 | 0 | 0 | 0 | 0 | 0 |
| 14 | 7 | 0 | 0 | 0 | 0 | 0 | 0 | 0 | 0 | 0 | 0 | 0 | 0 | 0 | 0 | 0 | 0 |
| 15 | 7 | 0 | 0 | 0 | 0 | 0 | 0 | 0 | 0 | 0 | 0 | 0 | 0 | 0 | 0 | 0 | 0 |

FIG. 5

| Input | 0100 1001 = 73 | 1100 0011 = 195 |
|---|---|---|
| Row Address | 0100 = 4 | 1100 = 12 |
| Bits in selected row | 0000 0000 0100 0000 | 0100 0000 0000 0000 |
| Bit address | 1001 = 9 | 0011 = 3 |
| Value of selected bit | 1 = word is present in table | 0 = word is not present |
| Bits input to population counter | 0000000001 | |
| Output of population count | 1 | |
| Last Index in selected row | 1 | |
| Sum of population count and Last Index | 1+1 = 2 = index | |
| Overall result | The input is in the table in location 2. | The input is not in the table |

FIG. 6

| Index | Range |
|:-:|:-:|
| 0 | 3 |
| 1 | 11-20, 22, 25-35 |
| 2 | 87 |
| 3 | 99 |
| 4 | 101-102 |
| 5 | 200-210 |
| 6 | 225 |
| 7 | 245 |

FIG. 7

| Row # | Last Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | -1 | 00 | 00 | 00 | 11 | 00 | 00 | 00 | 00 | 00 | 00 | 00 | 11 | 10 | 10 | 10 | 10 |
| 1 | 1 | 10 | 10 | 10 | 10 | 10 | 00 | 10 | 00 | 00 | 10 | 10 | 10 | 10 | 10 | 10 | 10 |
| 2 | 1 | 10 | 10 | 10 | 10 | 00 | 00 | 00 | 00 | 00 | 00 | 00 | 00 | 00 | 00 | 00 | 00 |
| 3 | 1 | 00 | 00 | 00 | 00 | 00 | 00 | 00 | 00 | 00 | 00 | 00 | 00 | 00 | 00 | 00 | 00 |
| 4 | 1 | 00 | 00 | 00 | 00 | 00 | 00 | 00 | 00 | 00 | 00 | 00 | 00 | 00 | 00 | 00 | 00 |
| 5 | 1 | 00 | 00 | 00 | 00 | 00 | 00 | 00 | 11 | 00 | 00 | 00 | 00 | 00 | 00 | 00 | 00 |
| 6 | 2 | 00 | 00 | 00 | 11 | 00 | 11 | 10 | 00 | 00 | 00 | 00 | 00 | 00 | 00 | 00 | 00 |
| 7 | 4 | 00 | 00 | 00 | 00 | 00 | 00 | 00 | 00 | 00 | 00 | 00 | 00 | 00 | 00 | 00 | 00 |
| 8 | 4 | 00 | 00 | 00 | 00 | 00 | 00 | 00 | 00 | 00 | 00 | 00 | 00 | 00 | 00 | 00 | 00 |
| 9 | 4 | 00 | 00 | 00 | 00 | 00 | 00 | 00 | 00 | 00 | 00 | 00 | 00 | 00 | 00 | 00 | 00 |
| 10 | 4 | 00 | 00 | 00 | 00 | 00 | 00 | 00 | 00 | 00 | 00 | 00 | 00 | 00 | 00 | 00 | 00 |
| 11 | 4 | 00 | 00 | 00 | 00 | 00 | 00 | 00 | 00 | 00 | 00 | 00 | 00 | 00 | 00 | 00 | 00 |
| 12 | 4 | 00 | 00 | 00 | 00 | 00 | 00 | 00 | 00 | 11 | 10 | 10 | 10 | 10 | 10 | 10 | 10 |
| 13 | 5 | 10 | 10 | 10 | 00 | 00 | 00 | 00 | 00 | 00 | 00 | 00 | 00 | 00 | 00 | 00 | 00 |
| 14 | 5 | 00 | 11 | 00 | 00 | 00 | 00 | 00 | 00 | 00 | 00 | 00 | 00 | 00 | 00 | 00 | 00 |
| 15 | 6 | 00 | 00 | 00 | 00 | 00 | 11 | 00 | 00 | 00 | 00 | 00 | 00 | 00 | 00 | 00 | 00 |

FIG. 8

| Input | 208 = 1101 0000 |
|---|---|
| Row Address | 1101 = 13 |
| Bits in selected row | 10 10 10 00 00 00 00 00 00 00 00 00 00 00 00 00 |
| Bit address | 0000 = 0 |
| Value of selected position | 10 = number is in table, but not start of range |
| Bits input to population counter | 0 |
| Output of population count | 0 |
| Last Index in selected row | 5 |
| Sum of population count and Last Index | 0+5 = 5 = index |
| Overall result | The input is in the table in location 5. |

FIG. 9

CIRCUITS TO GENERATE A SEQUENTIAL INDEX FOR AN INPUT NUMBER IN A PRE-DEFINED LIST OF NUMBERS

CROSS REFERENCE TO RELATED APPLICATIONS

This application claims priority to and incorporates by reference the entirety of the following U.S. provisional applications: U.S. Application Ser. No. 60/455,150, entitled Memory And Power Efficient Longest-Prefix Match-Capable Content Addressable Memory, filed on Mar. 15, 2003, U.S. Application Ser. No. 60/442,779, entitled Efficient Implementation Of Content Addressable Memory Functions, filed on Jan. 27, 2003, U.S. Application Ser. No. 60/441,809, entitled Circuits To Generate A Sequential Index For An Input Number In A Pre-Defined List Of Numbers, filed on Jan. 21, 2003.

FIELD OF INVENTION

The present invention relates to the field of memory devices and more particularly to the field of content addressable memories (CAMs).

BACKGROUND—DESCRIPTION OF PRIOR ART

Figure 1:
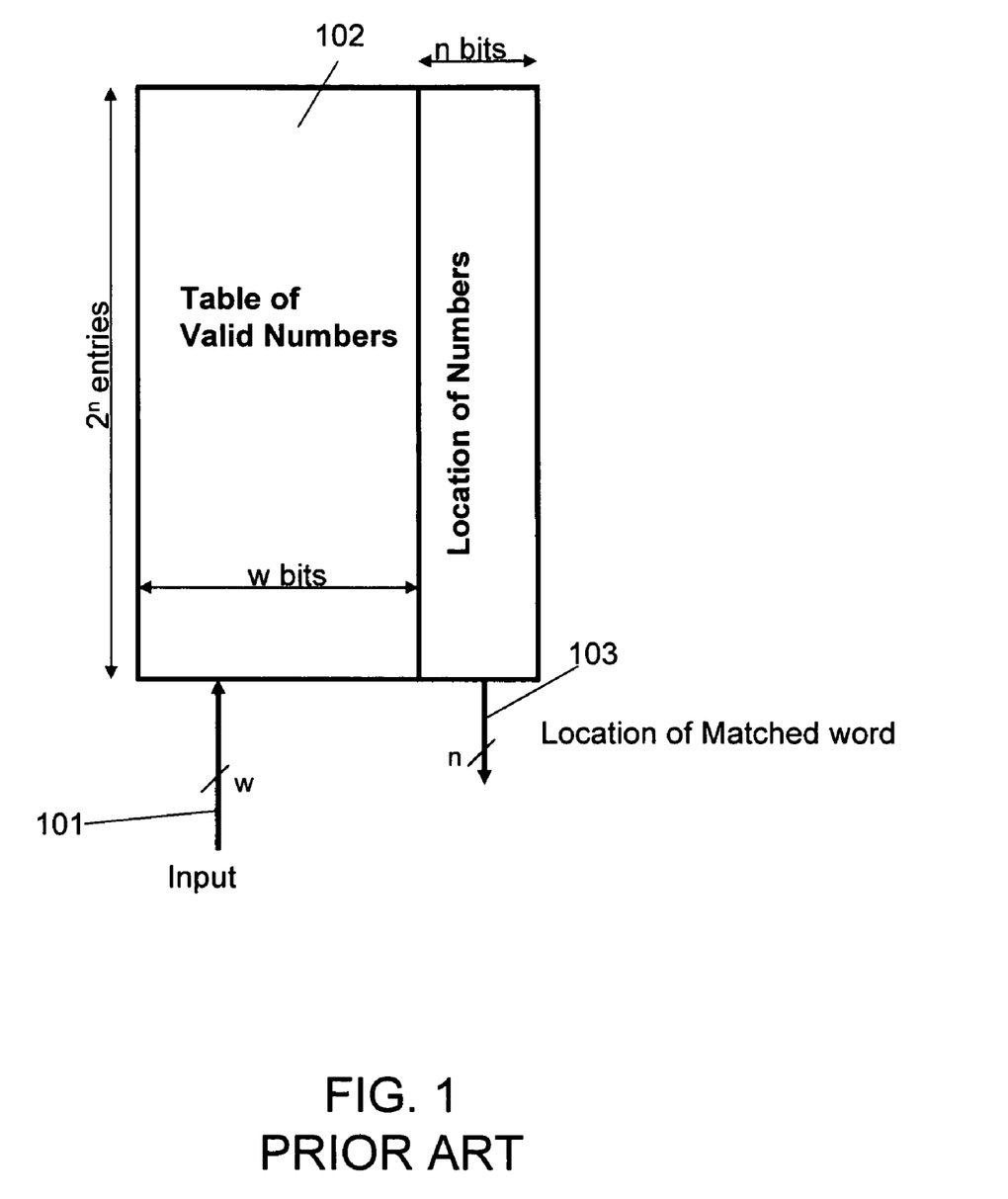
FIG. 1 is a schematic of a CAM used to look up a number in a list of numbers.

The typical CAM is illustrated in FIG. 1. An input number of width w (101) is compared against a table of allowed values (102). If there is a match, the location of the matched word (103) is returned. If the list of allowed values is $2^n$ long, the CAM has to contain a minimum of $2^n \times w$ bits of memory along with comparators, also $2^n \times w$ in number.

Figure 2:
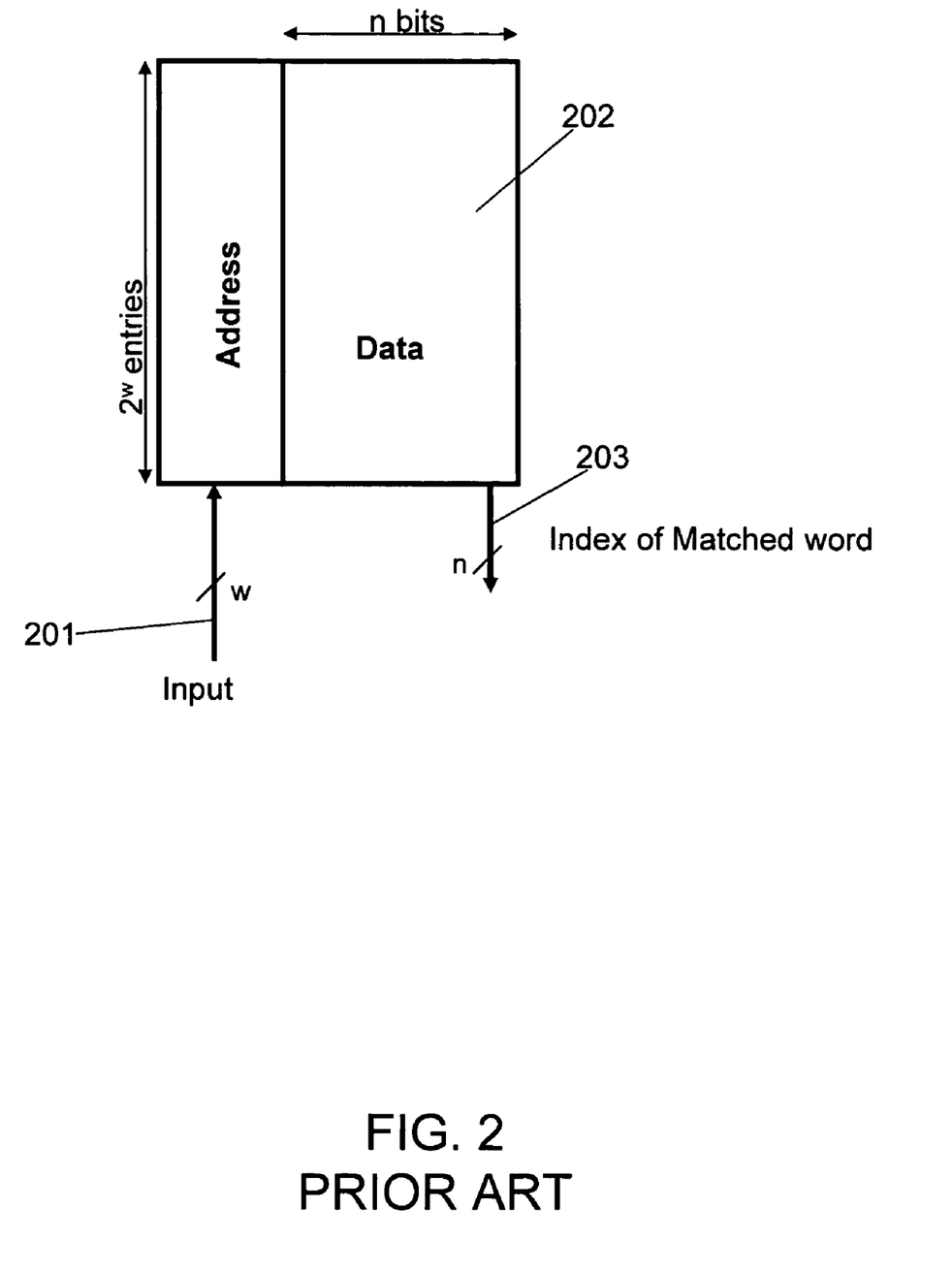
FIG. 2 shows how a RAM can be used to obtain the function of a CAM.

It is also possible to perform the function of the CAM using a Random Access Memory, or RAM, using $2^w \times n$ bits of RAM, as shown in FIG. 2. The input number 201 is used to address a location in the memory 202 which contains the index 203 for that number, if it is in the list of allowed values. If the number is not in the list the corresponding index is value is set to some special value indicating no-match.

CAMs are expensive since each cell contains a memory element as well as a comparison circuit. Obtaining equivalent functionality with RAMs may require significantly more memory when the numbers are very wide.

The present invention improves upon these conventional CAMs. The system and method disclosed here can compare inputs of width w against a list of length up to $2^w$ using only about $2^w$ bits of RAM. As a result, considerable cost savings are possible compared to previous implementations. Number ranges and arbitrary groupings of numbers are possible using extensions of the methods of the disclosure. The application of this invention extends beyond searches and lookups. For example, the method could be used to compress symbols in a communication stream.

SUMMARY OF THE INVENTION

Methods are disclosed to determine whether a given input word is found in a list of numbers, or number ranges, and if found, the present invention generates an index that is in a compact range equal exactly to the number of elements in the list.

DETAILED DESCRIPTION OF THE PREFERRED EMBODIMENT

Figure 3:
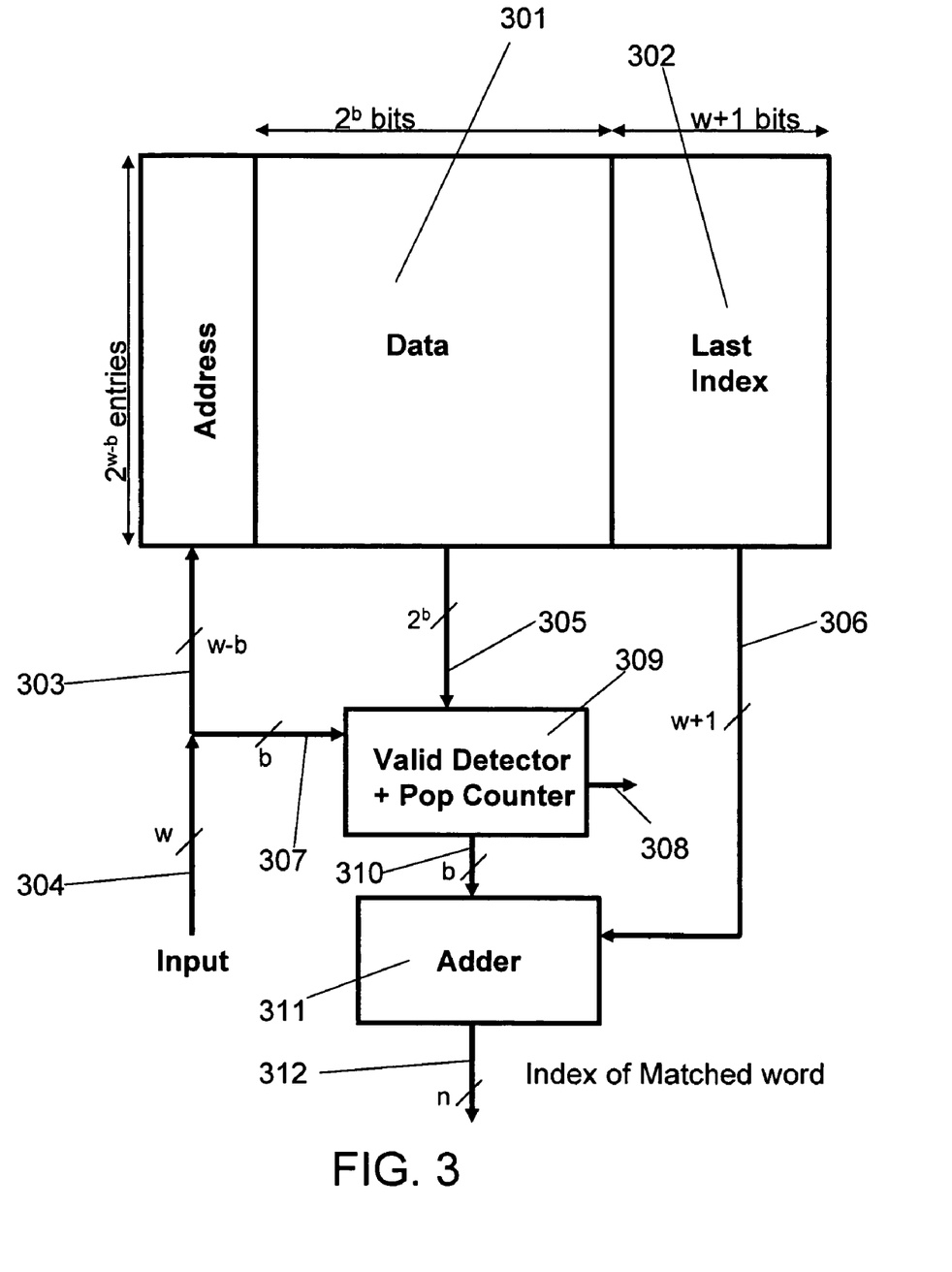
FIG. 3 is a schematic of the method according to one embodiment of the present invention.

FIG. 3 is an embodiment of the invention to lookup inputs against of table of $2^w$ elements. $2^w$ bits of memory are arranged in rows of length $2^b$ bits (301). There are $2^{w-b}$ rows. Each row also has an associated value, called the "Last Index", of length w+1 bits (302.) The w-b high order bits (303) of the input word (304) are used to select a particular row in the memory, and that word is output on lines 305, and the Last Index is output on lines 306. The b low order bits of the input word (307) are used to indicate a particular bit position in word read out. If the indicated bit is not set, the circuit generates an invalid signal (308.) If the bit is set, a population count circuit (309) counts all the ones in the word up to the selected bit and the result appears in lines 310. The adder 311 adds the population count to the Last Index of the selected row. The result 312 is the index of the input word in the list.

The embodiment described requires only approximately $2^w$ RAM elements for lists of length up to $2^w$ and width w. An equivalent CAM would require up to $(2^w \times w)$ CAM elements. Not only are fewer elements used (smaller by a factor of w), the RAM elements used are much cheaper than the CAM elements, resulting in a tremendous overall cost savings. Compared to prior art RAM implementations, the method shown here reduces the number of elements, and hence the cost by a factor w.

Operation

Figure 4:
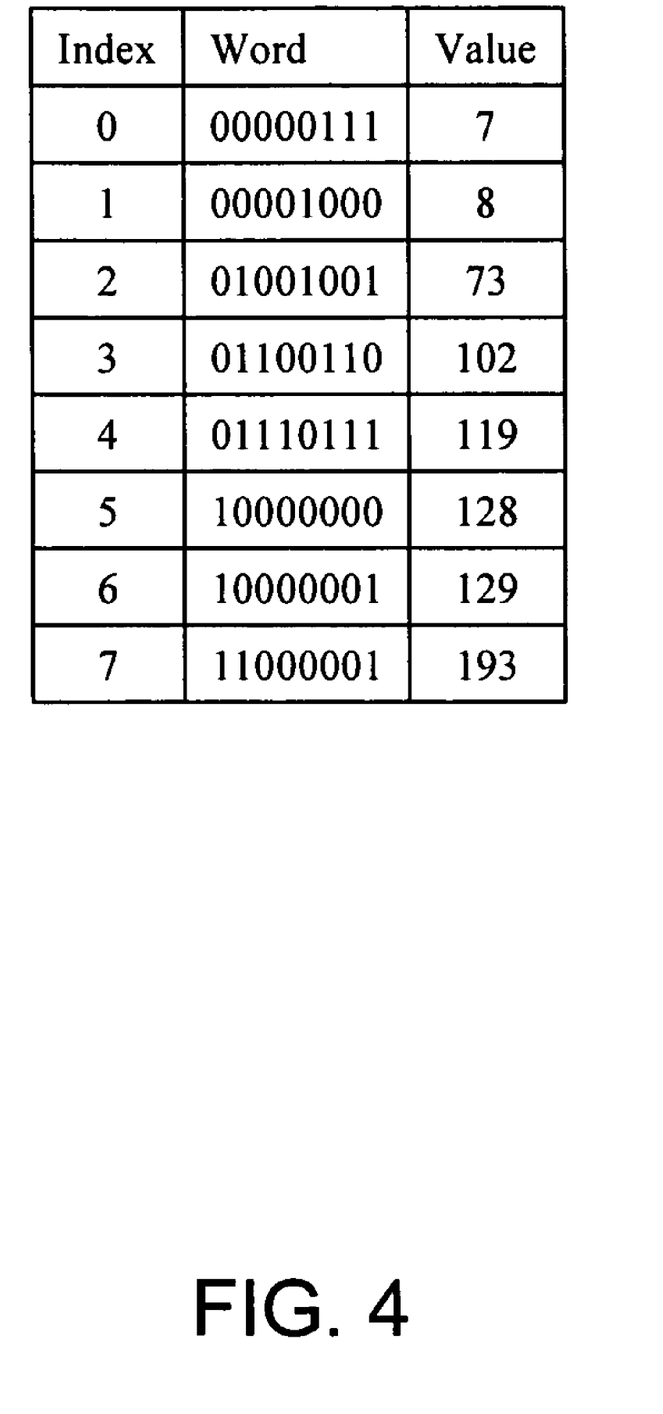
FIG. 4 is an example table of numbers.
Figure 5:
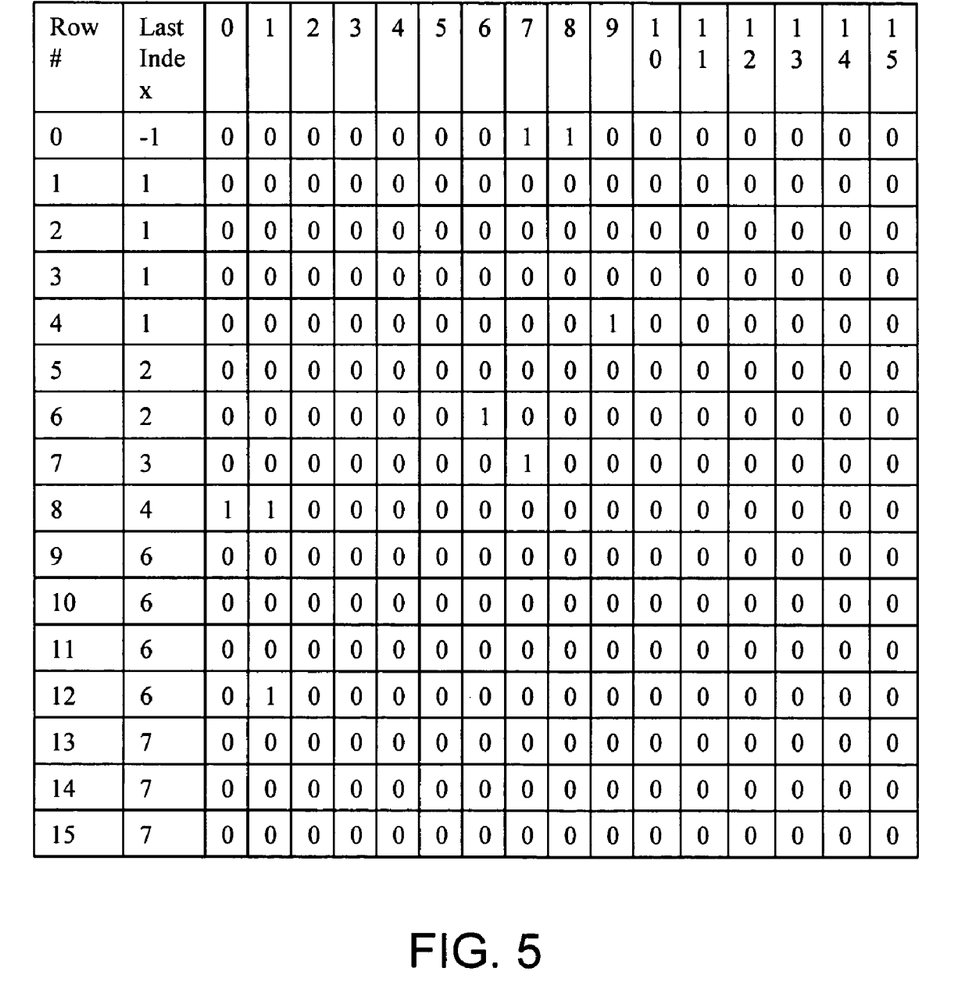
FIG. 5 shows the value of bits used for implementing the table of FIG. 3.

The operation is illustrated by considering table in FIG. 4 which shows a list of 8 valid numbers, each 8 bits long. The valid values are 7, 8, 73, 102, 119, 128, 129, and 193. These values loaded into an embodiment of the invention with 16 rows, each with 16 bits, and a Last Index value of 4 bits as shown in the table of FIG. 5. All bits of the table of FIG. 5 are 0 except for the $7^{th}$, $8^{th}$, $73^{rd}$, $102^{nd}$, $119^{th}$, $128^{th}$, $129^{th}$, and $193^{rd}$ bits which are set to 1. The Last Index is set to the total of the number of bits set in all previous rows reduced by 1.

Figure 6:
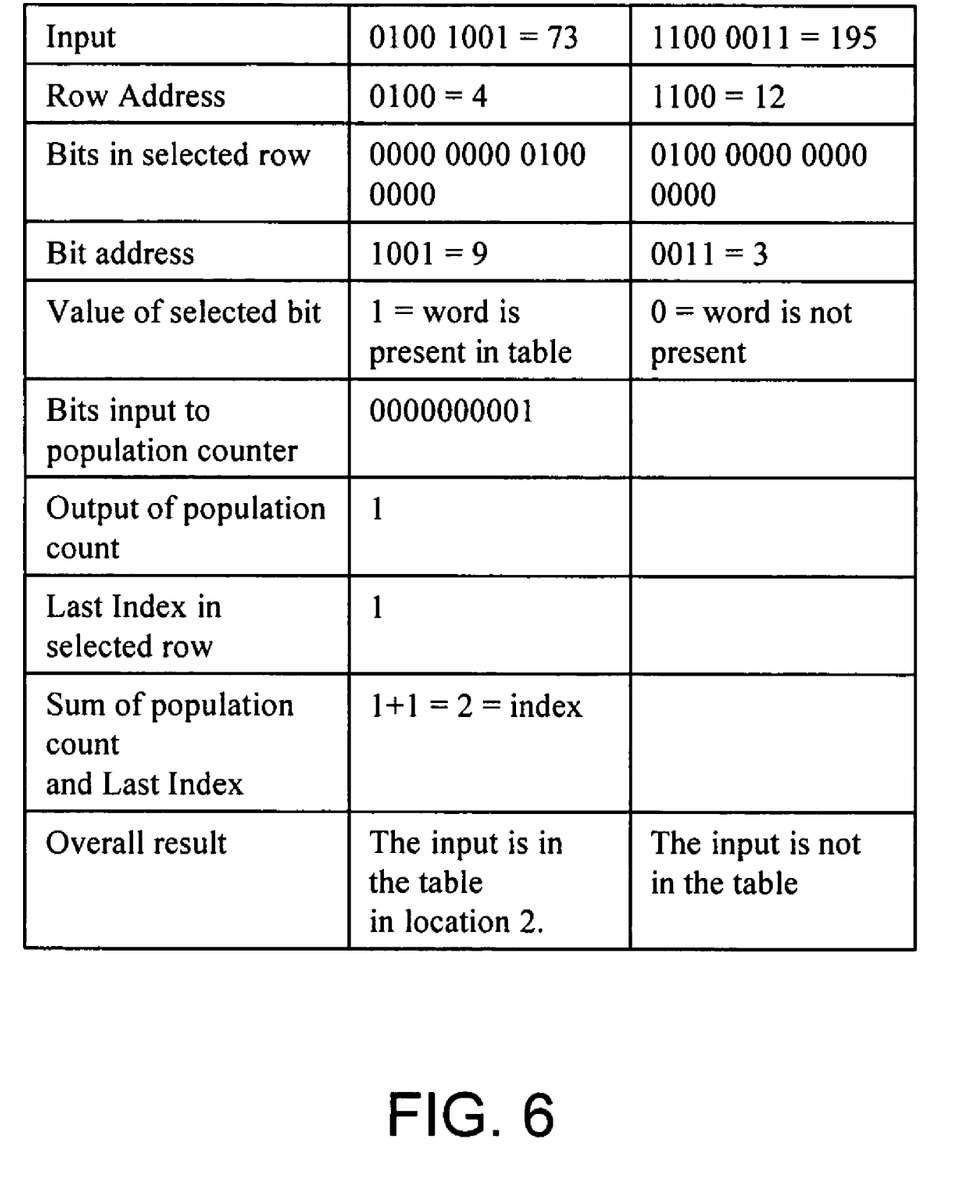
FIG. 6 shows how two example input numbers are processed according to one embodiment of the present invention.

The table in FIG. 6 shows two illustrative input words, and the steps to arrive at the index. The first column shows the processing of an input word that is found in the list, i.e. 0100 1001. When the input word is presented to the circuit, the 4 high order bits (in this instance 0100) are used to address the rows, and thus row 4 is selected. The low order bits (in this instance 1001) are used to select a position in the row, and thus position 9 is selected. Since the bit in the selected position is 1, the input word is in the table. The bits in the row up to position 9, i.e. bits 0 through 9 are added up by the population count circuit. The sum is added to the Row Subtotal for that row, and the result gives the sequential index of the input number. The second column shows the processing an input word that is not found in the list, i.e. 1100 0011. When the input word is presented to the circuit, the 4 high order bits (in this instance 1100) are used to address the rows, and thus row 12 is selected. The low order bits (in this instance 0011) are used to select a position in the row, and thus position 3 is selected. Since the bit in the selected position is 0, it indicates that the input number is not part of the table, and hence an invalid signal will be generated.

The invention can be extended by adding additional bits to the table and by changing the processing of a selected row. An example extension allows mapping of a set of numbers in a given range of numbers. The set of numbers need not be contiguous as long as no other index in the same list is mapped to a number in the range.

Figure 7:
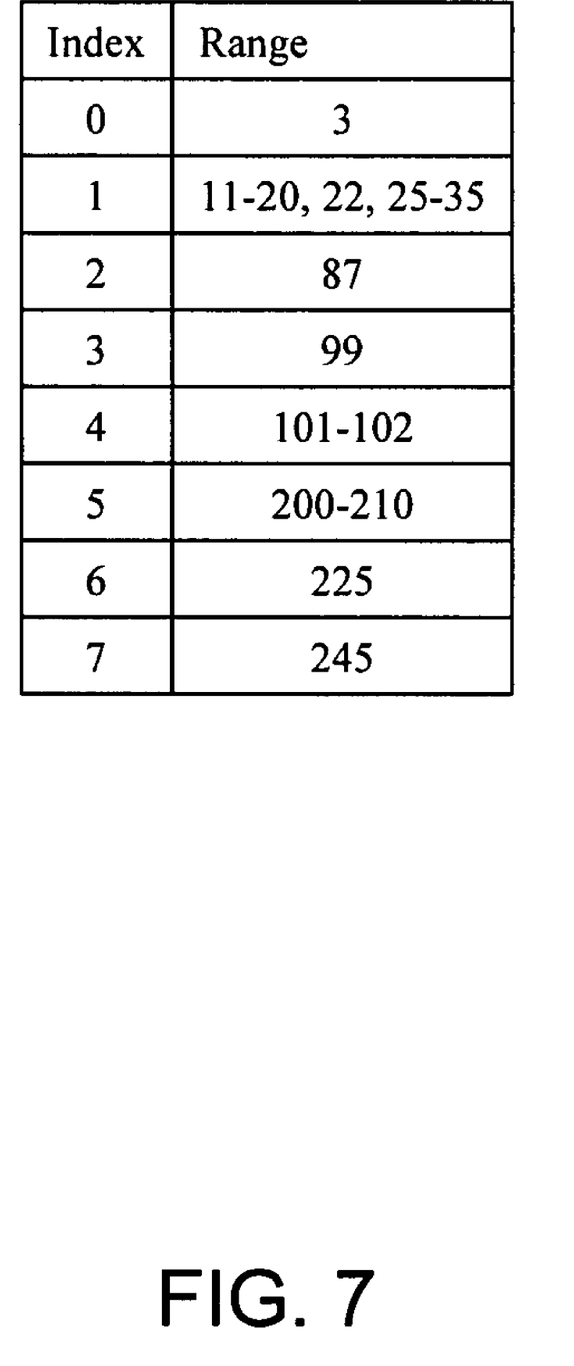
FIG. 7 is an example table with a set of numbers in each element of the table.
Figure 8:
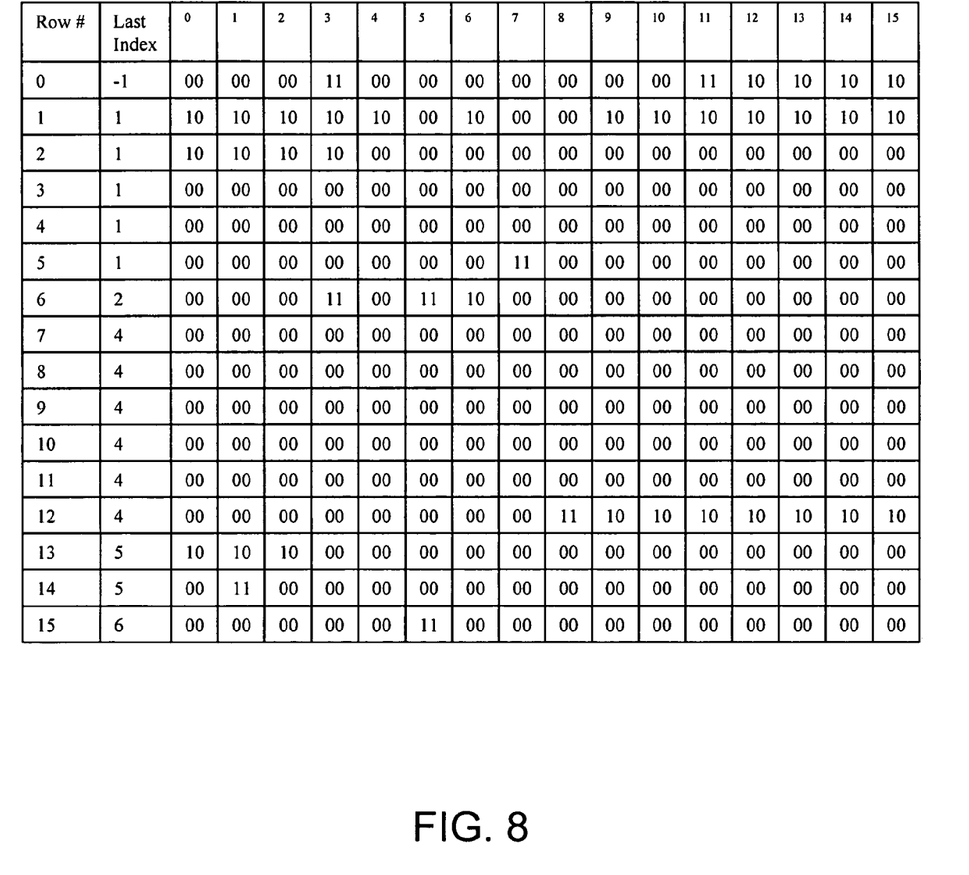
FIG. 8 shows the value of bits used for implementing the table of FIG. 6.
Figure 9:
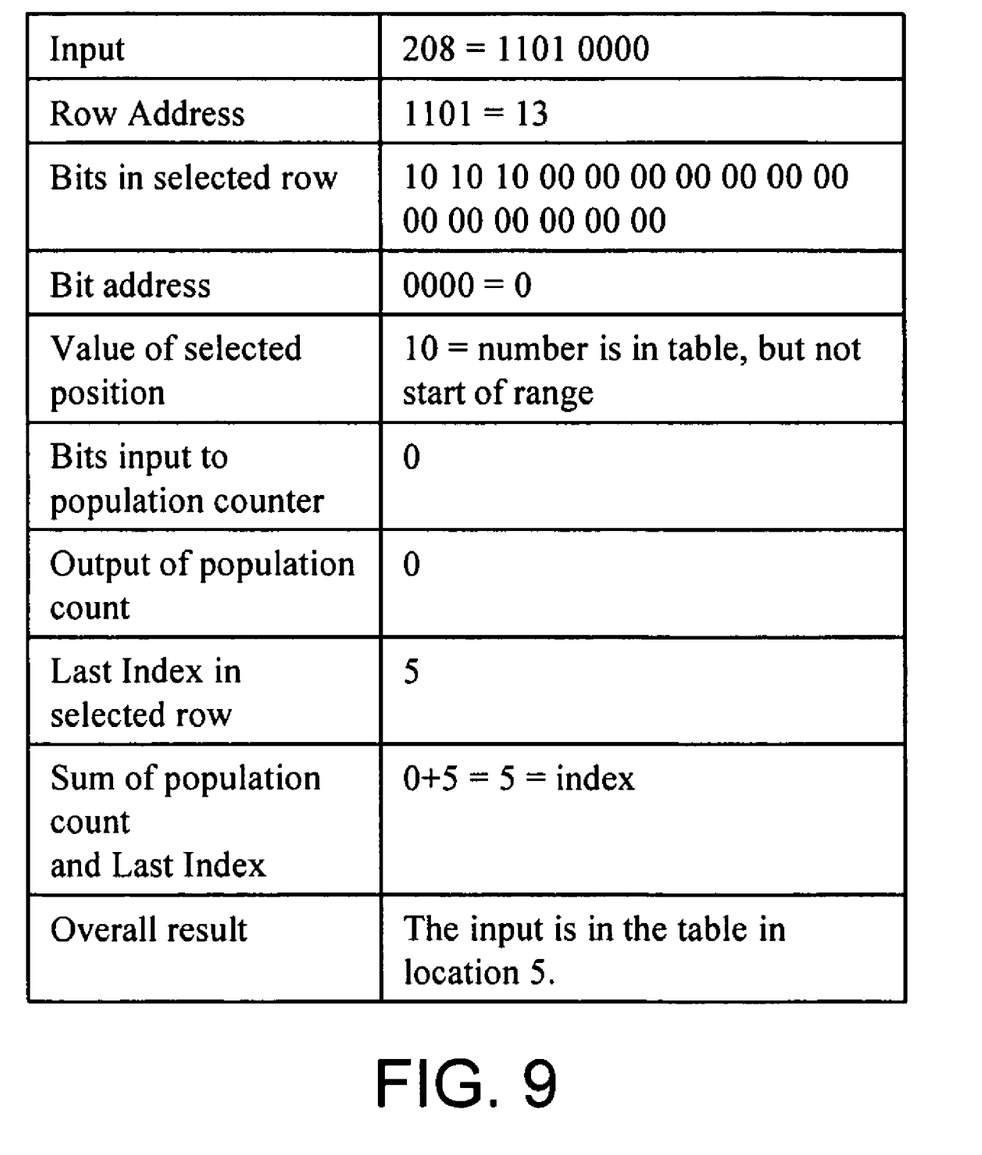
FIG. 9 shows how an example input number is processed according to one embodiment of the present invention.

Sets of numbers are handled by adding an additional bit to each position in a row. The first bit indicates if the position is a valid number in the list, while the second bit indicates whether it is the start of the set of numbers. The population count circuit only counts the number of start-of-set bits up to the selected position, and the Last Index has the count of all start of range bits before the selected row reduced by 1. The table of FIG. 7 shows an example with number ranges. The assignment of bits in an embodiment of the invention is shown in FIG. 8. The first bit in each location is set if the corresponding number is in the list. Thus considering the values for index value 1, the locations 11 through 20, 22, and 25 through 35 are set to 1. The second bit of each location is set only for the first location of each index. Thus for index 1, the second bit is set only in location 11. FIG. 9 shows the processing of an example input value, 1101 0000. The row chosen is 13, and the bit address is 0. The $1^{st}$ bit is set at this location, so the input is in the list. In order to compute the index, the $2^{nd}$ bit is added up to the selected location, resulting in an index of 5.

I claim:

1. A system for generating a sequential index of an input value of w bits in a first list of up to $2^w$ entries with a set of groupings with each grouping having at least one entry, each of said entries having a width of w bits, comprising:
  a memory having $2^w$ elements of memory arranged in a first number of rows with each row having a data portion having a second number of elements and each row having a last index portion of a forth number of bits, a third number of bits of the input value are used to select a selected row from said first number of rows, said selected row including a selected data portion and a selected last index portion, where the sum of the second and third numbers is w;
  a population count device, disposed to receive said selected data portion and said second number of bits of the input value,
    for determining whether the input value is one of the entries in said first list,
    for generating a first output signal value when the input value is not one of the entries in said first list, and
    for generating a population count value when the input value is one of the entries in said first list; and
  a sequential index device, disposed to receive said population count value and said selected last index portion, for combining said population count value and said last index value to generate the sequential index when the input value is one of the entries in said first list.

2. The system of claim 1, wherein said population count value represents the number of entries in the list, in said selected row, positioned up to the input value position, that are entries in the first list.

3. The system of claim 2, wherein the number of entries in said selected row position up to the input value position is determined using said second number of bits of the input value.

4. The system of claim 1, wherein said first number is $2^{w-b}$, said second number is b, and said third number (w-b).

5. The system of claim 1, wherein said second number of elements can be two or more bits.

6. The system of claim 5, wherein the sequential index can correspond to two or more values.

7. The system of claim 1, wherein the sequential index can correspond to two or more values.

8. The system of claim 1, wherein said data portion includes information regarding the entries of said first list.

9. The system of claim 1, wherein said fourth number of bits is at least the number of bits required to categorize a total number of groupings in the set of groupings.

10. The system of claim 1, where the memory is a random access memory.

11. A method for generating a sequential index of an input value of w bits in a first list of up to $2^w$ entries with a set of groupings with each grouping having at least one entry, each of said entries having a width of w bits, stored in a memory having $2^w$ elements of memory arranged in a first number of rows with each row having a data portion having a second number of elements and each row having a last index portion of a forth number of bits, comprising the steps of:
  selecting a selected row from said first number of rows using a third number of bits of the input value, said selected row including a selected data portion and a selected last index portion, where the sum of the second and third numbers is w;
  determining whether the input value is one of the entries in said first list,
  generating a first output signal value when the input value is not one of the entries in said first list, and
  generating a population count value when the input value is one of the entries in said first list; and
  combining said population count value and said last index value to generate the sequential index when the input value is one of the entries in said first list.

12. The method of claim 11, wherein said population count value represents the number of entries in the list, in said selected row, positioned up to the input value position, that are entries in the first list.

13. The method of claim 12, wherein the number of entries in said selected row position up to the input value position is determined using said second number of bits of the input value.

14. The method of claim 11, wherein said first number is $2^{w-b}$, said second number is b, and said third number (w-b).

15. The method of claim 11, wherein said second number of elements can be two or more bits.

16. The method of claim 15, wherein the sequential index can correspond to two or more values.

17. The method of claim 11, wherein the sequential index can correspond to two or more values.

18. The method of claim 11, wherein said data portion includes information regarding the entries of said first list.

19. The method of claim 11, wherein said fourth number of bits is at least the number of bits required to categorize a total number of groupings in the set of groupings.

20. The method of claim 11, where the memory is a random access memory.

* * * * *

UNITED STATES PATENT AND TRADEMARK OFFICE
CERTIFICATE OF CORRECTION

| | | |
|---|---|---|
| PATENT NO. | : 7,155,563 B1 | Page 1 of 1 |
| APPLICATION NO. | : 10/763020 | |
| DATED | : December 26, 2006 | |
| INVENTOR(S) | : Madian Somasundaram | |

It is certified that error appears in the above-identified patent and that said Letters Patent is hereby corrected as shown below:

Claim 1, column 3, line 48, please delete "forth" and insert --fourth--

Claim 11, column 4, line 31, please delete "forth" and insert --fourth--

Signed and Sealed this

Sixth Day of March, 2007

JON W. DUDAS
*Director of the United States Patent and Trademark Office*